(12) United States Patent
Tavlykaev et al.

(10) Patent No.: US 6,236,772 B1
(45) Date of Patent: May 22, 2001

(54) LINEARIZED Y-FED DIRECTIONAL COUPLER MODULATORS

(75) Inventors: Robert F. Tavlykaev; Ramu V. Ramaswamy, both of Gainesville, FL (US)

(73) Assignee: Advanced Photonics Technology, Inc., Gainesville, FL (US)

(*) Notice: Subject to any disclaimer, the term of this patent is extended or adjusted under 35 U.S.C. 154(b) by 0 days.

(21) Appl. No.: 09/561,637

(22) Filed: May 2, 2000

Related U.S. Application Data

(63) Continuation-in-part of application No. 09/127,092, filed on Jul. 31, 1998, now Pat. No. 6,101,296.
(60) Provisional application No. 60/054,460, filed on Aug. 1, 1997.

(51) Int. Cl.[7] .................................................. G02F 1/035
(52) U.S. Cl. ................................................................ 385/2
(58) Field of Search .............................. 385/1–3, 16, 122, 385/141, 130, 40; 359/332, 326; 257/17, 21, 18

(56) References Cited

U.S. PATENT DOCUMENTS

| | | | |
|---|---|---|---|
| 4,795,225 | * | 1/1989 | Sakai et al. ............................. 385/16 |
| 4,887,884 | * | 12/1989 | Hayden ..................................... 385/1 |
| 5,283,685 | * | 2/1994 | Horsthuis ............................... 359/332 |
| 5,757,023 | * | 5/1998 | Koteles et al. ........................ 257/21 |
| 5,970,186 | * | 10/1999 | Kenney et al. ....................... 385/122 |

* cited by examiner

Primary Examiner—Akm E. Ullah
(74) Attorney, Agent, or Firm—Saliwanchik, Lloyd & Saliwanchik

(57) ABSTRACT

The subject invention pertains to electro-optic devices and, in particular, to an integrated-optic modulator with a linearized transfer curve. In a specific embodiment, an integrated-optic modulator with a linearized transfer curve can be formed in an electro-optic substrate and comprises an input Y-junction, a section of two coupled waveguides, followed by two output waveguide bends. Light from a CW optical source can be launched into the input Y-junction and amplitude modulated by applying an external voltage to the electrodes positioned on the top surface of the substrate. The modulator can be driven in both the uniform and Db configuration. By properly adjusting the length of the sections in the coupler with respect to the coupling length, the linearity of the transfer curve is improved. The subject invention is further concerned with realizing modulators with suppressed nonlinear distortions for analog optical links, for example fiber-optic communication links and cable television systems. Third-order harmonics and intermodulation distortions of the Y-fed modulator can be significantly suppressed, thus, increasing the dynamic range of an analog optical system that incorporates the modulator. A two-section linearized Y-fed modulator with a domain reversal in a ferroelectric material is described which utilizes a simple uniform electrode structure fully compatible with high-speed applications.

11 Claims, 8 Drawing Sheets

LINEARIZED Y-FED DIRECTIONAL COUPLER MODULATORS

CROSS-REFERENCE TO RELATED APPLICATION

This application is a continuation-in-part of U.S. application Ser. No. 09/127,092 filed on Jul. 31, 1998 now U.S. Pat. No. 6,101,296, which claims the benefit of U.S. Provisional application No. 60/054,460, filed Aug. 1, 1997.

FIELD OF INVENTION

The subject invention pertains to electro-optic devices and in particular, to an integrated-optic modulator with a linearized transfer curve. The subject invention is further concerned with realizing modulators with suppressed nonlinear distortions for analog optical links, including but not limited to fiber-optic communication links and cable television systems. In a specific embodiment, the subject invention relates to a coupled-waveguide modulator with a linearized transfer curve. The subject invention is also concerned with realizing high-speed modulators.

BACKGROUND OF THE INVENTION

Currently, information transmission, for example data and video transmission for cable television (CATV) and wireless communication systems, often utilizes long-haul fiber-optic links. In order to take advantage of the enormous bandwidth that the optical fiber provides, the optical carrier has to be modulated and transmitted at high rates. Directly modulated laser diodes have been used for this purpose, however, these modulated laser diodes are known to be susceptible to frequency chirping. This frequency chirping problem can be avoided by employing external modulators. Accordingly, analog systems based on efficient external modulators are highly desirable for many commercial and military applications, for example sensor systems, fiber-optic telecommunication links, and microwave antenna remote detection systems.

Guided-wave electro-optic modulators in which light is confined within a waveguiding area of small transversal size are promising candidates for such applications. Although several commercial integrated-optic (IO) modulators are currently available, distortions caused by nonlinearities in their modulation curves severely degrade their performance. Typically, these modulation curves exhibit sine-squared behavior, thus hindering widespread deployment of integrated-optic modulators in high-performance analog optical systems typically requiring that nonlinear distortions be 95 dB below the carrier.

A number of linearization techniques have been developed to suppress the nonlinear distortions produced by IO modulators. In general, these techniques fall into two categories, namely, electronic compensation and optical methods of linearization. Electronic techniques, based on predistortion compensation or feedforward compensation, involve expensive high-speed electronic components and are limited by a bandwidth of a few GHz or less. Optical techniques include the dual-polarization technique, the use of two- and three-section directional couplers, parallel modulation schemes, and various cascaded schemes. Common to all these techniques is that the improvement in linearity is achieved at the expense of more complex device designs, particularly in the case of cascaded schemes involving multiple modulator structures. Many of these techniques employ multiple electrode sections and, as a result, require several separate modulating sources and/or several bias controls. The need for several modulating sources and bias controls seriously hampers the use of these linearized devices in high-speed applications where efficient and convenient matching of the electrode structure to the microwave source is required. In addition, complex devices are prone to thermal and temporal instabilities that make these schemes unattractive for practical applications.

Accordingly, there is a need for an integrated-optic modulator with highly linear performance, simple design, and reduced sensitivity to fabrication deviations. In addition, a modulator without high-speed electronic components for linearization would be advantageous. Furthermore, a modulator with a simple uniform electrode structure which can be conveniently matched to a single microwave driving source would be particularly advantageous. Also, a modulator which can be utilized at high speeds would be particularly advantageous.

BRIEF SUMMARY OF THE INVENTION

The subject invention pertains to electro-optic devices and, in particular, to an integrated-optic modulator with a linearized transfer curve. The subject invention is further concerned with realizing modulators with suppressed nonlinear distortions for analog optical links, for example fiber-optic communication links and cable television systems. In a specific embodiment, the subject invention relates to a coupled-waveguide modulator with a linearized transfer curve.

An object of the subject invention is to provide a means of linearizing the transfer curve of a Y-fed (1×2) directional coupler modulator. Another object is to provide a means of suppressing the third-order nonlinear distortion of a Y-fed directional coupler modulator. This can be achieved by properly adjusting the interaction length with respect to the coupling length of the device. Both a single-section and two-section (Db-type) embodiment of a Y-fed coupler modulator can be linearized with the two-section embodiment being least sensitive to fabrication imperfections.

A specific embodiment of the subject invention involves a single-section Y-fed coupler modulator having an interaction length of about 2.63 times the coupling length such that the modulator has a linearized transfer curve.

An additional embodiment of the subject invention involves a single-section Y-fed coupler modulator with suppressed nonlinear distortions, wherein the interaction length is about 2.86 times the coupling length.

A further embodiment of the subject invention involves a two-section Y-fed coupler modulator with a linearized transfer curve, wherein the total interaction length is divided in two sections, one section about 4.1 times the coupling length and the other section about 1.05 times the coupling length.

An additional embodiment of the subject invention involves a two-section Y-fed coupler modulator with suppressed nonlinear distortions, wherein one section is about 2.3 times the coupling length and the other section is about 1.02 times the coupling length.

In a preferred embodiment of the subject invention, a two-section Y-fed coupler modulator is formed in a substrate with a region where the electro-optic coefficient is but opposite in sign to that of the rest of the substrate. In specific embodiment, the electro-optic coefficient in this region can be equal in magnitude and opposite in sign to that of the rest of the substrate. Depending on the material of the substrate, this region can be, for example, a domain reversal in a ferroelectric material, such as lithium niobate, or a region produced by reversed poling of a polymer material with artificially created electro-optic properties. In a specific embodiment, a uniform electrode section can be used. The simplicity of this embodiment combined with significantly improved linear performance is especially advantageous for practical applications.

BRIEF DESCRIPTION OF THE DRAWINGS

The invention, together with its various features and advantages, can be readily understood from the following more detailed description taken in conjunction with the accompanying drawings, in which.

DETAILED DISCLOSURE OF THE INVENTION

The subject invention pertains to electro-optic devices and, in particular, to an integrated-optic modulator with a linearized transfer curve. The subject invention is further concerned with realizing modulators with suppressed nonlinear distortions for analog optical links, for example fiber-optic communication links and cable television systems. In a specific embodiment, the subject invention relates to a coupled-waveguide modulator with a linearized transfer curve.

An object of the subject invention is to provide a means of linearizing the transfer curve of a Y-fed (1×2) directional coupler modulator. Another object is to provide a means of suppressing the third-order nonlinear distortion of a Y-fed directional coupler modulator. This can be achieved by properly adjusting the interaction length with respect to the coupling length of the device. Both a single-section and two-section (Db-type) embodiment of a Y-fed coupler modulator can be linearized with the two-section embodiment being least sensitive to fabrication imperfections.

Figure 1:
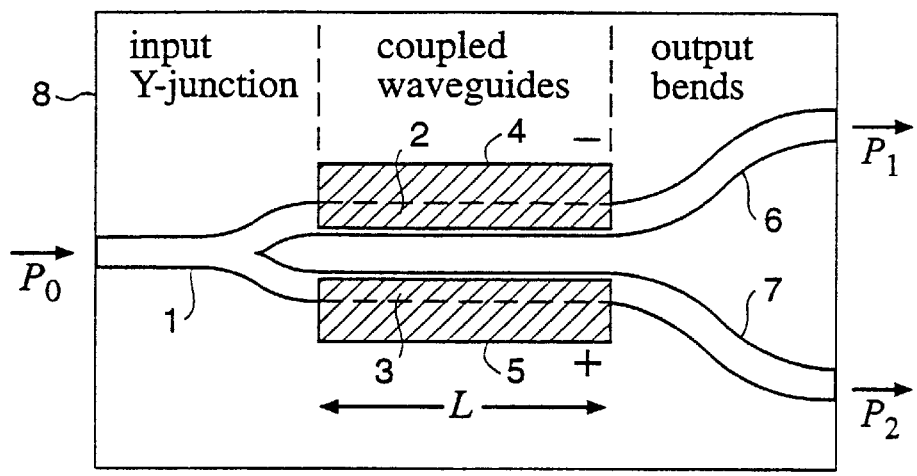
FIG. 1 is a schematic view of a conventional single-section Y-fed modulator in an electro-optic material.

A specific embodiment of the subject invention pertains to a single-section Y-fed coupler modulator as shown in FIG. 1. The device is formed in an electro-optic substrate 8 and comprises an input Y-junction 1, a pair of coupled waveguides 2 and 3, and output bends 6 and 7. Coupled waveguides 2 and 3 are in close proximity to one another so that the evanescent tails of the guided modes overlap and the waveguides can exchange optical power. The power transfer between the waveguides can be controlled by an external voltage, for example, applied to electrodes 4 and 5. This applied voltage can dephase the guided modes in the coupled waveguides via the electro-optic effect in the material. When no modulating voltage is applied, light coupled into the input Y-junction 1 can split evenly between the coupled waveguides 2 and 3. When symmetric waveguide structures are utilized, the light at the modulator output can be equally distributed between the output arms 6 and 7, regardless of the length of the coupled-waveguide section. In contrast, when an external voltage is applied to electrodes 4 and 5, a phase mismatch between the coupled waveguides is introduced, eliminating the device symmetry and causing unequal splitting of the output light.

FIG. 1 shows electrodes 4 and 5 located over coupled waveguides 2 and 3. In a specific embodiment, this electrode configuration corresponds to a device fabricated in Z-cut $LiNbO_3$ which utilizes the largest electro-optic coefficient, i.e., $r_{33}$, to modulate TM (vertically) polarized light in an efficient push-pull configuration. In X-cut $LiNbO_3$, a three-electrode structure, with the coupled waveguides in between the electrodes, can be used to implement the push-pull operation for TE (parallel to the crystal surface) polarized light.

The dependence of the intensity of the output light on the applied voltage is the modulation (transfer) curve. The modulation curve of the single-section Y-fed modulator has been derived by S. Thaniyavarn, *Electron. Lett.*, vol. 22, No.18, pp. 941–942, 1986 and can be rewritten as:

$$\frac{P_1}{P_0} = \frac{1}{2} + \frac{x}{1+x^2}\sin^2\left[\frac{\pi}{2}\frac{L}{l}\sqrt{1+x^2}\right] \qquad (1)$$

where $P_0$ is the light power launched into the input Y-junction 1; $P_1$ is the light power in the output waveguide 6 (from the condition of power conservation, power in the output in waveguide 7 is $P_2=P_0-P_1$); L denotes the interaction length (electrodes 4 and 5 are of the same length), and l is the coupling length of the passive directional coupler comprised of the coupled waveguides 2 and 3. In equation (1), the normalized parameter x(V)=Db(V)/2k is used, where Db is the phase mismatch between the coupled waveguides due to the applied voltage V, and k is the coupling coefficient related to the coupling length as k=p/2l. For the linear electro-optic effect, the parameter x V.

As seen from equation (1), the modulation curve is, in general, nonlinear, and its shape is dependent on the interaction-length-to-coupling-length ratio s=L/l. Since the modulation curve is nonlinear, when the modulating signal is applied to the electrodes, the optical output is distorted with respect to the electrical signal. To characterize the linearity of device performance, two criteria are frequently used: the linearity of the transfer curve and the level of nonlinear distortions caused by this nonlinearity. The linearity of the transfer curve is characterized quantitatively by the linearity range m which is defined as the range of modulation depths within which the deviation of the modulation curve from the best straight-line fit is below some fraction, commonly set at 1%, of the maximum output power. Nonlinear distortion is characterized by its level, relative to that of the fundamental output, at a fixed modulating voltage, commonly assigned to that producing a 4% optical modulation depth.

Figure 2:
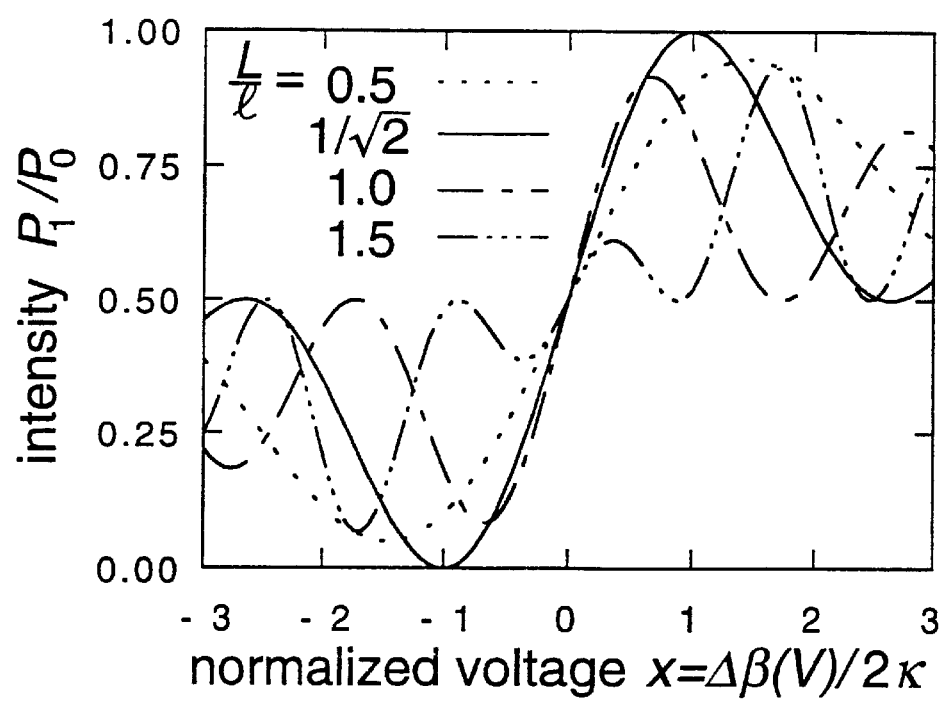
FIG. 2 shows the transfer curve of the single-section Y-fed modulator with s=L/l being a parameter.
Figure 3:
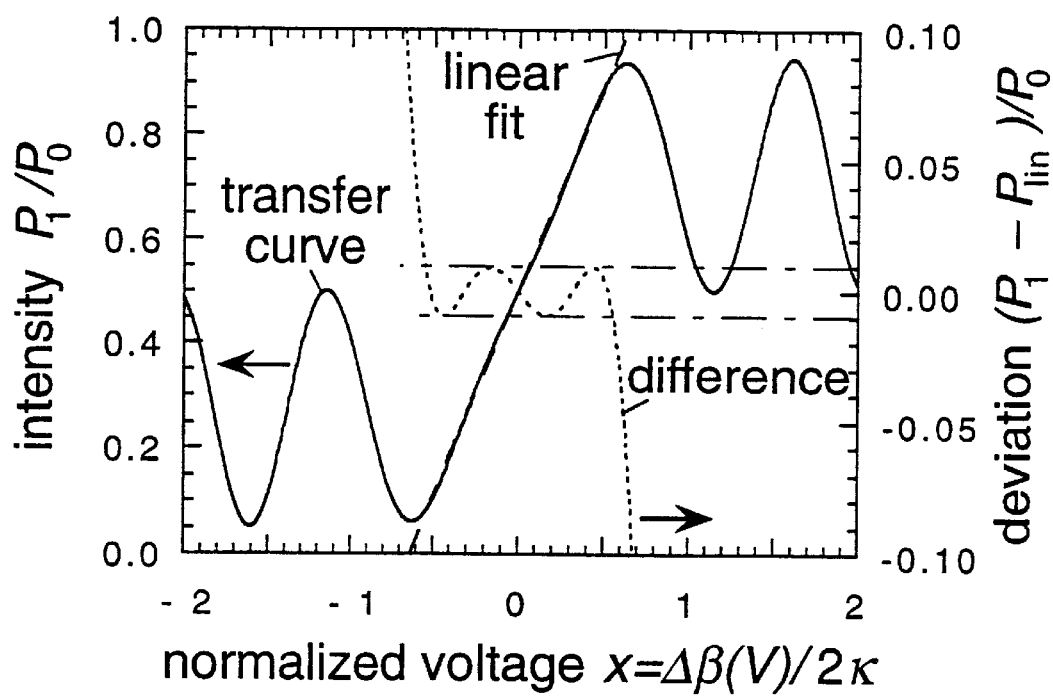
FIG. 3 shows the transfer curve of a linearized single-section Y-fed modulator having s=2.63, in accordance with this invention.

Thaviyavarn, U.S. Pat. No. 4,820,009, has pointed out that to achieve 100%-modulation efficiency, i.e., $P_1=1$ for some value of V, it is necessary that the value of s be equal to $1/\sqrt{2}$. Deviations from this value result in a reduction of the modulation depth as shown in FIG. 2. In a single-section Y-fed coupler modulator, the value $s=1/\sqrt{2}$, which is conventionally used in prior Y-fed modulators to achieve the maximum modulation depth of unity, does not provide maximum possible linearity. According to the subject invention, a substantially better linearity can be attained by appropriately selecting the length of the coupled waveguides (interaction length) with respect to the coupling length l. Specifically, for a value of 2.63 for the ratio $s=L/l$, the linearity of the transfer curve of the single-section Y-fed coupler modulator can be substantially improved over that of a single-section Y-fed coupler modulator with $s=1/\sqrt{2}$. The transfer curve for the case of $s=2.63$ is shown in FIG. 3. The range of linearity m reaches its peak value of $m_{max} \approx 90\%$ at $s_{lin}=2.63$, while m is only ~70% for the conventionally used $s=1/\sqrt{2}$. Advantageously, the improvement in linearity achieved by the subject invention does not involve different bias voltages, as is the case with the dual-polarization technique disclosed by L. Johnson and H. Rousell, *Opt. Lett.*, vol. 13, No.10, pp. 928–930, 1988, or the parallel modulation scheme proposed by S. Korotky and R. Ridder, *IEEE J. Selected Areas Commun.*, vol.8, No.7, pp.1377–1381, 1990.

Figure 4:
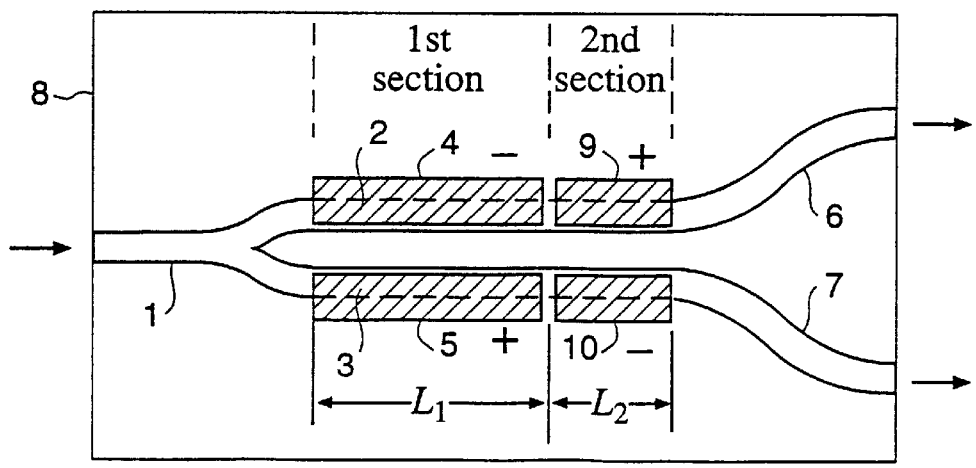
FIG. 4 illustrates a conventional two-section Y-fed modulator with separate electrode sections.

In an additional embodiment of the subject invention, a two-section Y-fed coupler in the reversed Db configuration, as shown in FIG. 4, is linearized. The waveguide structure consists of the same elements as those described in connection with the single-section Y-fed coupler. The electrode structure (electrodes 4, 5, 9, and 10) comprises two sections of unequal lengths, $L_1$ and $L_2$, and of opposite polarities, as proposed by Thaniyavarn, U.S. Pat. No. 4,940,305. The transfer curve of this device is determined by a matrix expression relating optical fields in the input and output channels:

$$\begin{bmatrix} R_{out} \\ S_{out} \end{bmatrix} = BA \begin{bmatrix} R_{in} \\ S_{in} \end{bmatrix} = \begin{bmatrix} b_{11} & b_{12} \\ b_{21} & b_{22} \end{bmatrix} \begin{bmatrix} a_{11} & a_{12} \\ a_{21} & a_{22} \end{bmatrix} \begin{bmatrix} R_{in} \\ S_{in} \end{bmatrix} \quad (2)$$

where $R_{in}$ ($S_{in}$) and $R_{out}$ ($S_{out}$) are the optical fields at the input and output of the coupled waveguides 2 and 3.

For a symmetric input Y-junction 1, $R_{in}=S_{in}=1/\sqrt{2}$. Matrix A corresponds to the first section (length $L_1$) and its coefficients $a_{ij}$ are given by the expressions:

$$a_{11} = \cos\left(\frac{\pi}{2}\frac{L_1}{l}\sqrt{1+x^2}\right) + j\frac{x}{\sqrt{1+x^2}}\sin\left(\frac{\pi}{2}\frac{L_1}{l}\sqrt{1+x^2}\right) \quad (3)$$

$$a_{12} = -j\frac{1}{\sqrt{1+x^2}}\sin\left(\frac{\pi}{2}\frac{L_1}{l}\sqrt{1+x^2}\right)$$

$$a_{21} = a_{12}$$

$$a_{22} = a_{11}^*$$

Matrix B corresponds to the second section (length $L_2$) and its coefficients $b_{ij}$ can be calculated by substituting in equation (3) variable $-x$ for $x$ and $L_2$ for $L_1$.

Figure 5:
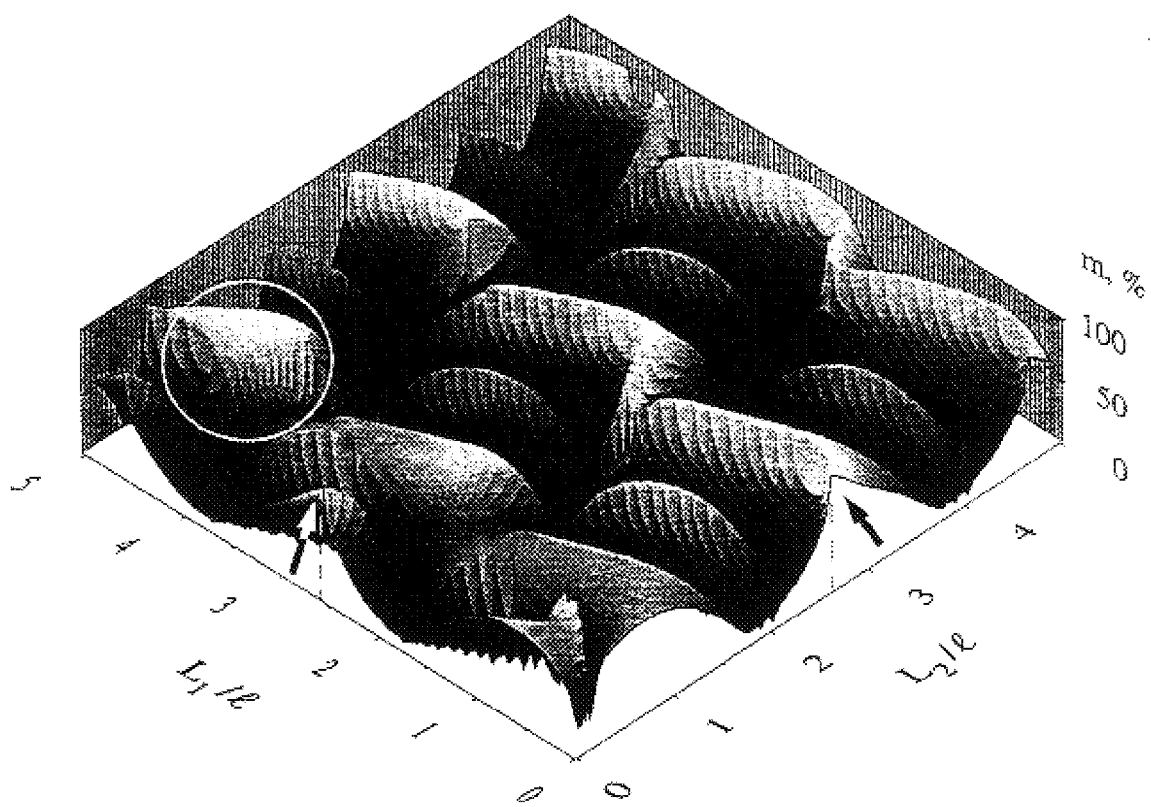
FIG. 5 shows the range of linearity vs. $s_1=L_1/l$ and $s_2=L_2/l$ for a two-section Y-fed modulator.
Figure 6:
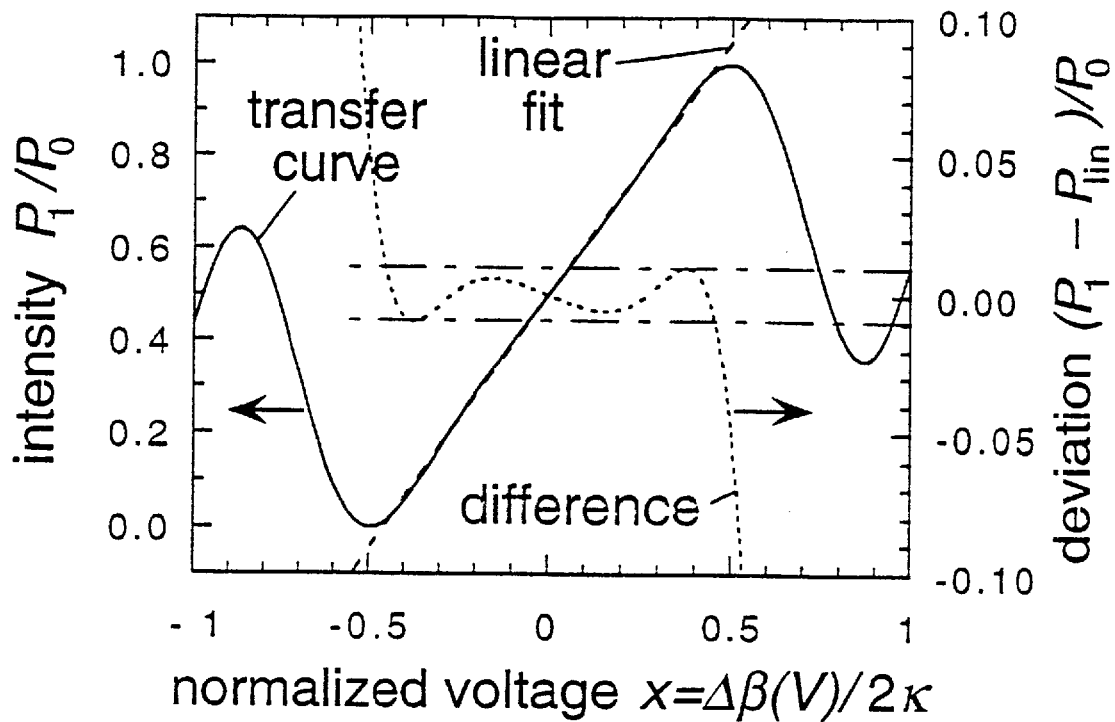
FIG. 6 shows the transfer curve of a linearized two-section Y-fed modulator having $s_1=4.1$ and $s_2=1.05$, in accordance with this invention.

Referring to equations (2) and (3), the modulation curve of the two-section Y-fed modulator can be uniquely defined by two parameters, for example, ratios $s_1=L_1/l$ and $s_2=L_2/l$ for the two sections. These ratios can be regarded as the relative lengths of the two sections with respect to the coupling length. FIG. 5 shows a perspective view of a two-dimensional surface, $m=m(L_1/l, L_2/l)$, of the range of linearity. Referring to FIG. 5, an even larger range of linearity is possible with the two-section modulator, with m reaching a maximum value of 99% for $s_1=4.32$ and $s_2=0.67$ (1% deviation). In a preferred embodiment, the lengths $L_1$ and $L_2$ can be selected so that the corresponding values of $s_1$ and $s_2$ are in the vicinity of $s_1=4.1$ and $s_2=1.05$, close to the center of the flattest 'plateau' (encircled in FIG. 5). The 'plateau' region of FIG. 5 defines the values of $s_1$ and $s_2$ corresponding to modulators with enhanced linearity and increased tolerance to fabrication imperfections. Referring to FIG. 5, it is clear that the two-section device has increased tolerance to fabrication deviations over the single-section embodiment. Indeed, the flattest 'plateau' of the surface in FIG. 5 provides significantly improved tolerance to fabrication imperfections compared to the sharp peaks (marked by arrows in FIG. 5), corresponding to the single-section device. Quantitatively, the two-section Y-fed modulator according to the subject invention exhibits better linearity than the 70% linearity for conventional modulators, for example a Mach-Zehnder interferometer, a 2×2 directional coupler, or a nonlinearized Y-fed modulator, within the entire range $3.81 \leq s_1 \leq 4.922$ and $0.763 \leq s_2 \leq 1.42$. FIG. 6 shows the transfer curve of a two-section Y-fed modulator with $s_1=4.1$ and $s_2=1.05$. The curve has a linearity range m of 98%. Advantageously, the modulation depth is very close to 100% in this case as compared to 90% for the transfer curve of the linearized single-section modulator illustrated in FIG. 3.

Table I summarizes the range of linearity m (%) versus variation in the coupling length l for certain linearized single-section and two-section embodiments of the subject invention. As the baseline, the range of linearity of 70% for a conventional, non-linearized single-section Y-fed modulator with $s=1/\sqrt{2}$ is chosen. Table I shows that both single-section and two-section Y-fed modulators have significantly improved ranges of linearity compared to that of a conventional device. Of the two linearized modulators, the two-section Y-fed modulator provides more relaxed requirements on the controls of the fabrication process while ensuring a high range of linearity.

TABLE I

| | Allowed deviation Δl/l for | | |
|---|---|---|---|
| Range of Linearity | Single-section device | Two-section device around $s_1 = 4.1$ and $s_2 = 1.05$ | |
| m (%) | around (s = 2.63) | 1st section | 2nd section |
| 70 | ±5% | ±13% | ±30% |
| 80 | ±3% | ±10% | ±26% |
| 90 | ±0.05% | ±8% | ±19% |
| 95 | | ±6% | ±11% |

Figure 7:
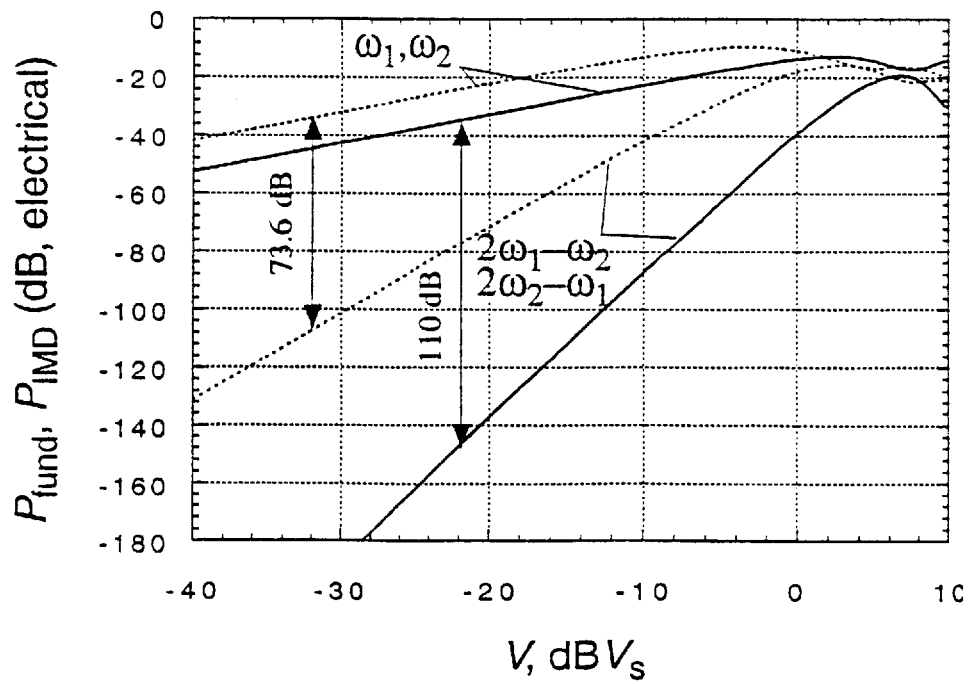
FIG. 7 shows the level of the fundamental output ($\omega_1, \omega_2$) and the 3rd-order IMD ($2\omega_1-\omega_2, 2\omega_2-\omega_1$) vs applied voltage for a conventional Y-fed modulator with s=1/√2 (dotted) and for a linearized single-section Y-fed modulator having s=2.86 (solid), in accordance with this invention. IMD suppression is determined at a 4% optical modulation depth.

A further embodiment of the subject invention involves a single-section Y-fed modulator with suppressed 3rd-order intermodulation distortion (IMD). According to this embodiment, IMD of the single-section Y-fed modulator can be suppressed if s is chosen to be, for example, in the vicinity of 2.86. FIG. 7 shows the levels of the fundamental output and 3rd-order IMD versus voltage for a single-section Y-fed modulator with $s=2.86$ (solid), as determined by the Fourier analysis of the modulated optical output. Also shown in FIG. 7 are the corresponding curves for a conventional single-section Y-fed modulator with $s=1/\sqrt{2}$ (dotted). At a 4% modulation depth, the linearized device according to the subject invention has 110 dBc (below carrier) of IMD suppression. By comparison, it is only 73.6 dBc for the same modulation depth for the conventional modulator with $s=1/\sqrt{2}$, as calculated by T. R. Halemane and S. K. Korotky, *IEEE Trans. Microwave Theory Tech.*, vol.38, No.5, pp.669–673, 1990.

Figure 8:
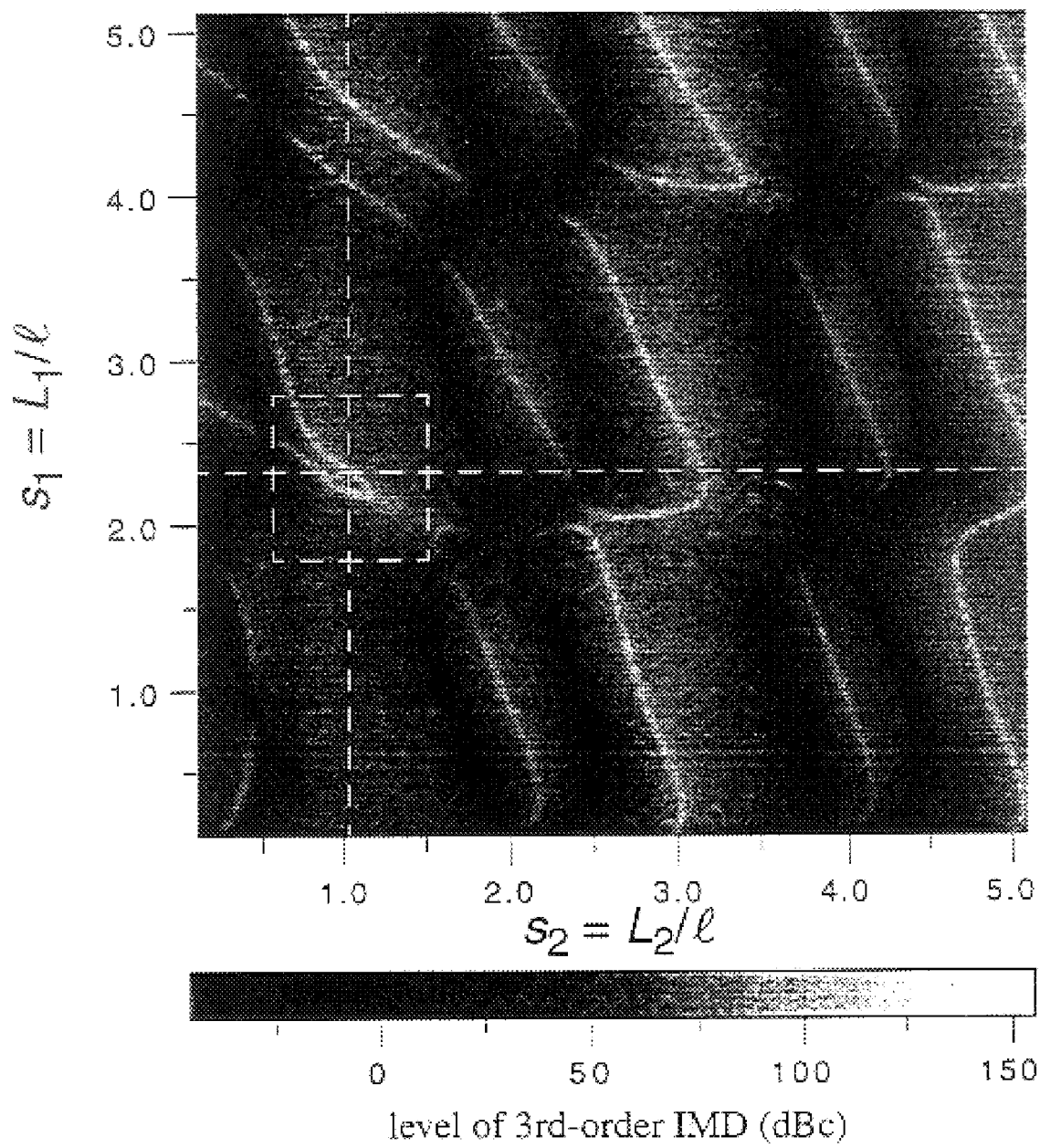
FIG. 8 shows the level of 3rd-order IMD (relative to the fundamental output) vs $s_1$ and $s_2$ for a two-section Y-fed modulator.

An additional embodiment of the subject invention concerns a two-section Y-fed modulator with suppressed 3rd-order intermodulation distortion (IMD). According to this embodiment, the IMD is strongly suppressed when the lengths, $L_1$ and $L_2$, of the sections are chosen such that the values of $s_1$ and $s_2$ are near the point with $s_1=2.3$ and $s_2=1.02$. FIG. 8 illustrates the top view of the IMD suppression level over a broad range of values of $s_1$ and $s_2$. Advantageously, reduced sensitivity of device performance to fabrication deviations is achieved within the square area marked in FIG. 8.

Table II summarizes the relative IMD level versus variation in the coupling length l for certain linearized single-section and two-section embodiments of the subject invention. As the baseline, the IMD level of 73.6 dBc for a conventional, nonlinearized single-section Y-fed modulator with $s=1/\sqrt{2}$ is chosen. Table II shows that both single-section and two-section linearized Y-fed modulators have significantly suppressed IMD compared to that of a conventional device. Of the two linearized modulators, the two-section Y-fed modulator provides more relaxed requirements on the controls of the fabrication process while ensuring a high level of IMD suppression.

TABLE II

| IMD suppression | Allowed deviation Δl/l for | | |
|---|---|---|---|
| | | Two-section device | |
| (dBc) | Single-section device | 1$^{st}$ section | 2$^{nd}$ section |
| 73.6 | ±3% | ±19% | ±29% |
| 83.6 | | ±8% | ±21% |
| 93.6 | | ±4.8% | ±15% |
| 103.6 | | ±3.6% | ±12.4% |

Table III summarizes the range of linearity m(%) versus variation in the coupling length l for certain linearized single-section and two-section embodiments of the subject invention. As the baseline, the range of linearity of 70% for a conventional, non-linearized single-section Y-fed modulator with $s=1/\sqrt{2}$ is chosen. Table m shows that both single and two-section linearized Y-fed modulators can have significantly improved ranges of linearity, as well as significantly suppressed IMD, compared to that of a conventional device. Of the two linearized modulators, the two-section Y-fed modulator provides more relaxed requirements of the controls of the fabrication process while ensuring a high range of linearity, as well as a high level of IMD suppression.

TABLE III

| Range of Linearity | Allowed deviation Δl/l for | | |
|---|---|---|---|
| | | Two-section device around $s_1 = 2.3$ and $s_2 = 1.02$ | |
| m (%) | Single-section device | 1$^{st}$ section | 2$^{nd}$ section |
| | around (s = 2.63) | | |
| 70 | ±5% | ±21% | +26% |
| 80 | ±3% | ±13% | ±20% |
| 90 | ±0.05% | ±5% | ±8% |
| 91 | | ±3% | ±5% |

Figure 9:
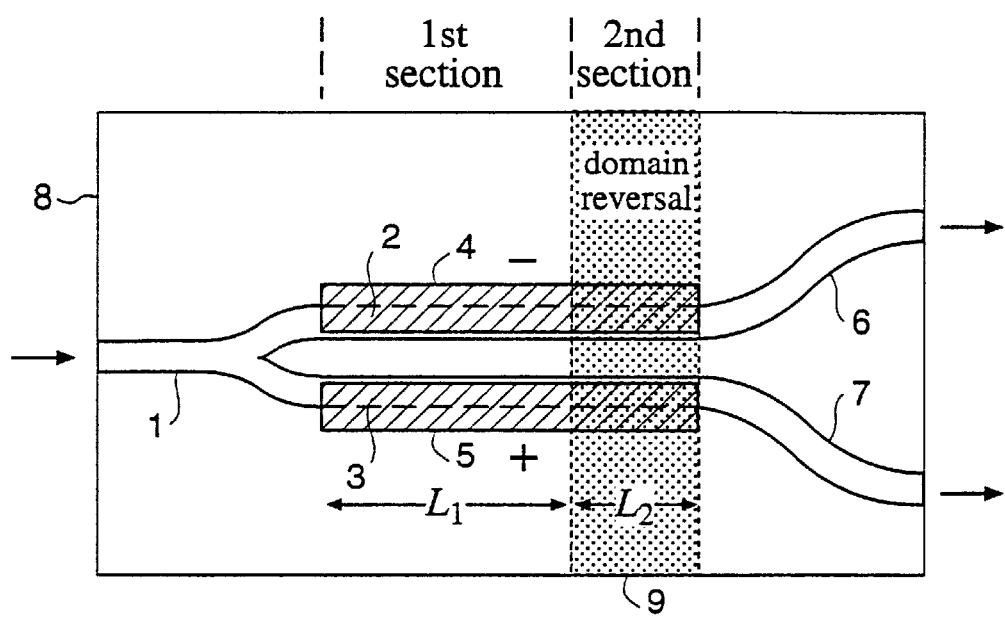
FIG. 9 exemplifies the preferred embodiment of a two-section Y-fed modulator in a ferroelectric material with a domain reversal and uniform electrode structure.

FIG. 9 illustrates a preferred embodiment of the subject invention in which a two-section Y-fed coupler modulator is fabricated in a ferroelectric substrate with a domain-inverted region and a uniform electrode structure. The domain reversal is utilized in order to eliminate the need for the two electrode sections of alternating polarities as shown in FIG. 4. Instead, one simple electrode structure filly compatible to a single microwave driving source is utilized. The effective electro-optic coefficient within the domain-inverted region is opposite in sign to that in the virgin (uninverted) region. In a specific embodiment, the effective electro-optic coefficient within the domain inverted region can be equal in magnitude and opposite in sign to the uninverted region. Various configurations of domain inverted region(s) and uninverted region(s) can be utilized in accordance with the subject invention. For example, light exiting the input Y-Junction 1 can enter an inverted region first or an uninverted region first (as shown in FIG. 9). In addition, multiple alternating inverted and uninverted regions can be utilized. Accordingly, the same applied voltage produces phase mismatch of opposite sign for the optical mode in the first and second sections (uninverted and inverted). The structures depicted in FIG. 4 and FIG. 9 are identical in terms of operation, with the domain-reversed scheme shown in FIG. 9 being a preferred choice for practical applications. In addition, reversal of the sign of the electro-optic coefficient can be achieved in a number of ways and in various materials, for example, in poled polymers with artificially created electro-optic properties.

The subject invention can utilize various techniques for minimizing the effects caused by mismatches in the velocities of the optical mode traversing the waveguide and the microwave propagating along the traveling-wave electrode. In a specific embodiment of the subject invention, a linearized Y-fed coupler modulator for use in high-speed applications can incorporate an electrode structure in the form of a traveling-wave line. In this case, the velocity mismatch between the optical mode traversing the waveguide structure and the microwave propagating along the traveling-wave electrode can be accounted for. Indeed, this velocity mismatch can affect the shape of the transfer curve and, hence, the linearity of the Y-fed coupler modulator. The modulation efficiency can also be affected by this velocity mismatch.

Figure 10:
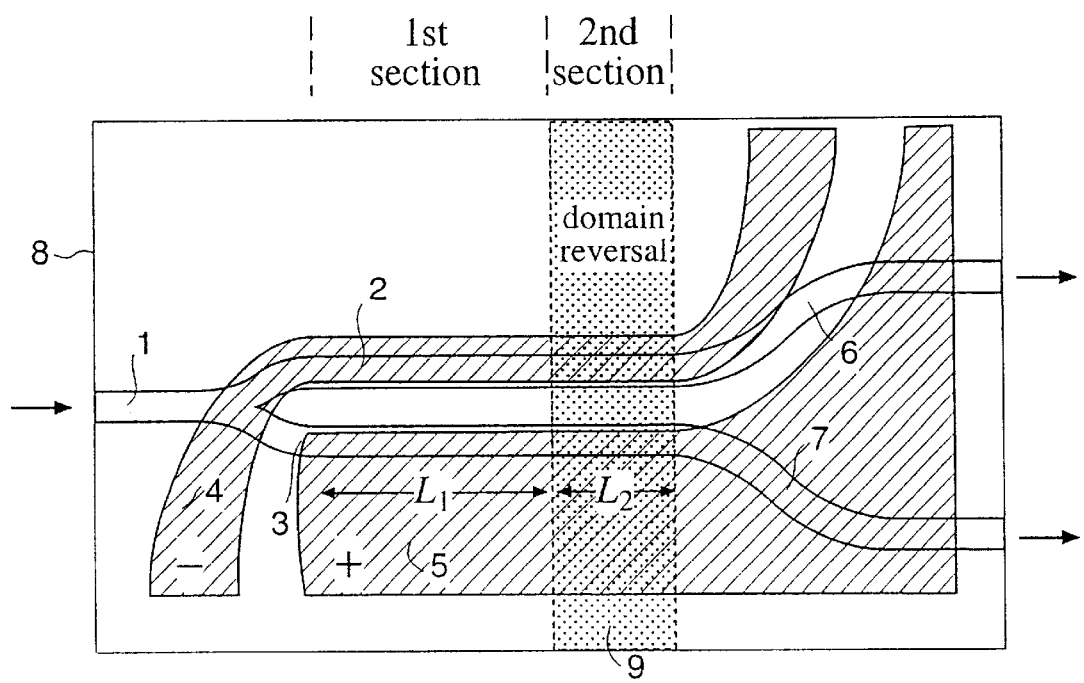
FIG. 10 shows a two-section Y-fed modulator in an electro-optic material with a domain reversal and a traveling-wave electrode structure.
Figure 11:
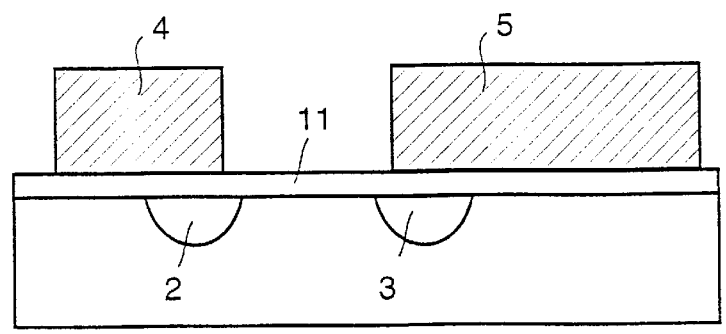
FIG. 11 illustrates the cross-section of the modulator of FIG. 10 with thick traveling-wave electrodes formed over the waveguides.

Velocity-matching techniques can be applied to address reductions in modulation efficiency and linearity. For example, ultra-thick traveling-wave electrodes can be utilized. An ultra-thick traveling-wave electrode structure can speed up the microwave by pulling the electric field of the microwave into the surrounding atmosphere above and between the electrodes. Typically, the surrounding atmosphere is air, which is a low-permittivity medium. Other low-permittivity mediums can be in contact with the electrodes. FIG. 11 depicts a cross-section of a modulator in accordance with the subject invention with thick traveling-wave electrodes 4, 5 and a buffer layer 11 formed over the waveguides 2 and 3. FIG. 10 shows a top view of the modulator of FIG. 11. The thicknesses of the electrodes and the buffer layer can be selected such that a microwave index close or equal to the effective optical mode index can be obtained. The thicknesses of the electrodes and buffer layer can also be selected such as to achieve a microwave impedance close to 50 Ω.

Figure 12:
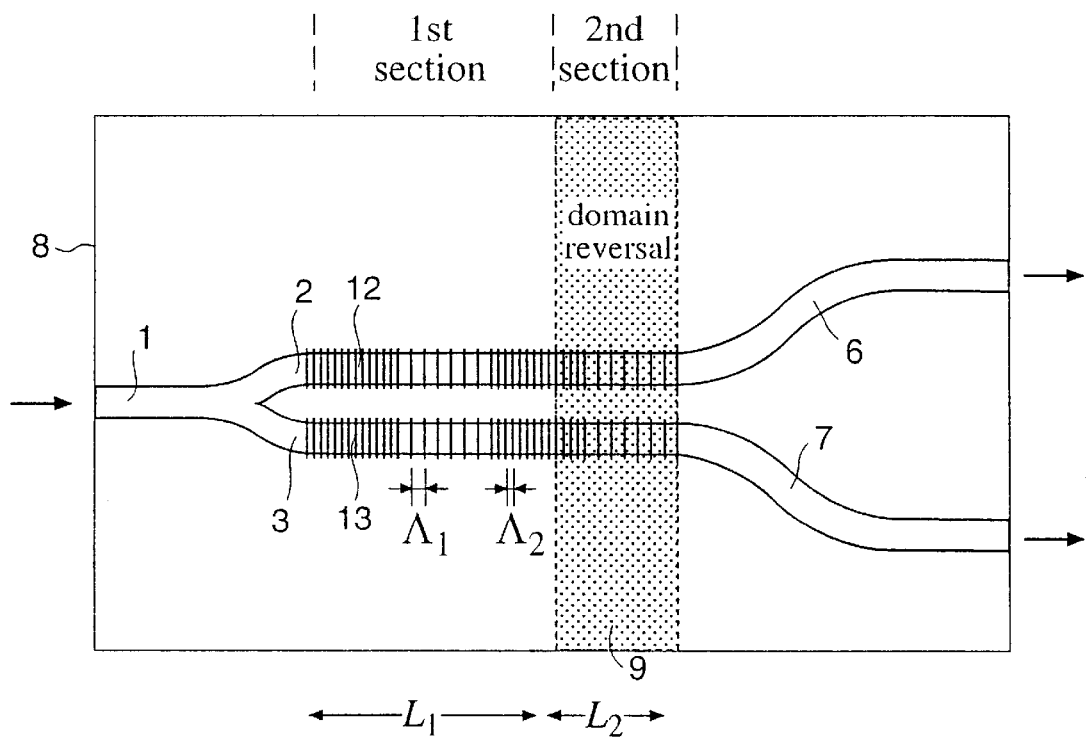
FIG. 12 illustrates a top view of the waveguide structure of the modulator of FIG. 10 in which a cascaded grating reflector is formed to provide velocity matching between the optical mode and microwave.

The mismatch between the microwave and optical mode can also be addressed by changing the speed of the optical mode. For example, the optical mode can be slowed down by incorporating waveguide grating reflectors. In a specific embodiment, waveguide grating reflectors can be used to reduce velocity mismatches for modulators in accordance with the subject invention which are fabricated with materials, such as ferroelectrics, resulting in a faster optical mode, wherein the optical mode is slowed down. As shown in FIG. 12, cascaded two-section gratings 12 and 13 can be formed in the arms 2 and 3 of the linearized two-section Y-fed coupler modulator. Other cascaded grating configurations can also be used in accordance with the subject modulator. The cascaded gratings can utilize alternating sections with periods, $\Lambda_1$ and $\Lambda_2$, chosen such as to reduce the group velocity of the optical mode a desired amount. S. Wang et al. have experimentally demonstrated that such a cascaded grating can significantly slow down an optical mode. They reported a 34% reduction in the speed of the light with cascaded reflectors compared to the speed of the light without cascaded reflectors. In the ferroelectric material lithium niobate, where the microwave and optical indices are typically 4.0 and 2.14, respectively, the optical mode is about twice as fast as the microwave. Accordingly, for lithium niobate a reduction in the speed of the optical mode of about 50% can be implemented. The reduction in the speed of light can be varied by adjusting the distance between the stopbands that correspond to the two periods.

A variety of techniques can be used for making waveguide gratings. In a specific embodiment, the two Bragg reflectors can be corrugated gratings formed from a high-index overlay. For example, a silicon corrugated grating can be overlayed over a lithium niobate substrate. High-reflectance Si gratings can be used in lithium niobate, H. Feng et al. Another implementation of Bragg reflectors can utilize a photorefractive grating immersed into the waveguide structure. This can be accomplished by, for example, selectively doping the waveguiding area. For instance, rare-earth elements, such as Erbium or Praseodymium can be used as dopants. In addition, Praseodymium can be used for making photorefractive gratings in bulk $LiNbO_3$, H. Guenther et al.

Other techniques for altering the speed of the microwave and/or the optical mode can also be utilized with the subject invention. As the optical mode is typically faster than the microwave, the microwave can be sped up and/or the optical mode slowed. Accordingly, if preferred, the microwave can be sped up and the optical mode slowed at the same time.

Figure 13:
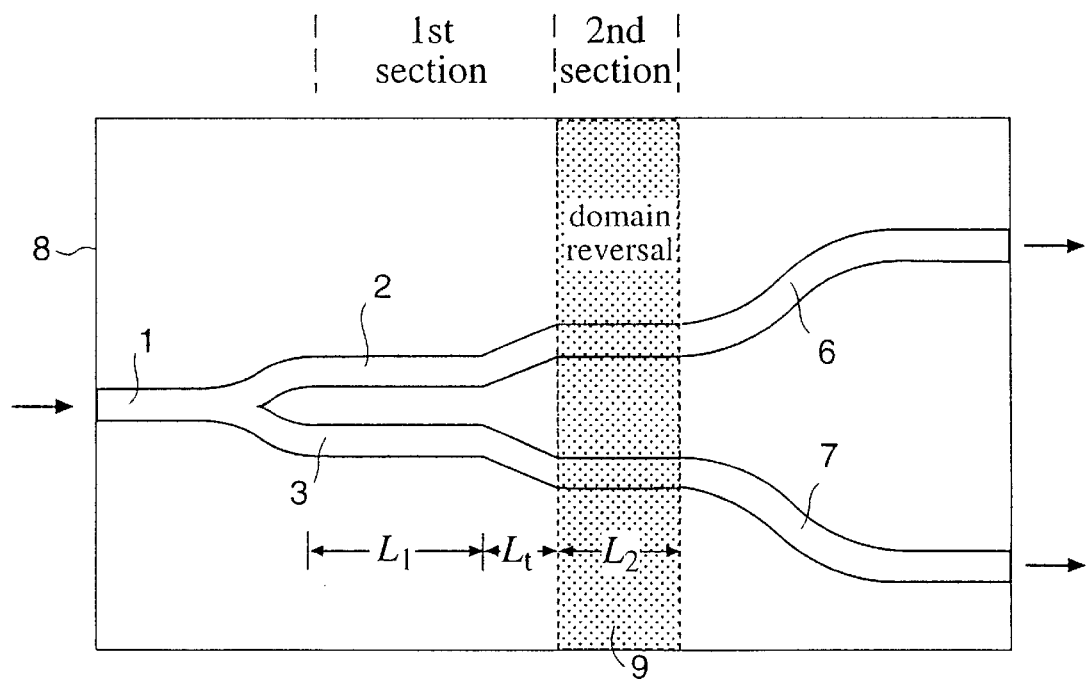
FIG. 13 exemplifies the waveguide structure of a generalized two-section Y-fed modulator wherein the two sections have different inter-waveguide gaps and, hence, different coupling coefficients.

In a specific embodiment of the subject invention, a linearized two-section Y-fed coupler modulator, as shown in FIG. 13, can incorporate a waveguide structure having at least two sections with differing coupling coefficients. The difference can be introduced by, for example, making unequal inter-waveguide gaps in the various sections. In the embodiment shown in FIG. 13, the two sections will, in general, require two different voltages. These two voltages can still be produced from a single driving source if, for example, a voltage divider is used. The length $L_t$ of the transition region between the two sections can be made negligibly short compared with the lengths $L_1$ and $L_2$ of the two sections.

It is understood that the above described arrangements are merely illustrative and that many other possible specific embodiments can be devised to represent application of the principles of the invention. Numerous and varied other arrangements can be devised in accordance with these principles by those skilled in the art without departing from the spirit and scope of the invention.

References

U.S. Patent Documents

| | | | |
|---|---|---|---|
| 4,820,009 | 4/1989 | Thaniyavarn | 350/06.13 |
| 4,940,305 | 7/1990 | Thaniyavarn | 350/96.14 |
| 5,031,235 | 7/1991 | Raskin et al. | 370/3 |
| 5,161,206 | 3/1992 | Djupsjöbacka | 385/2 |
| 5,249,243 | 9/1993 | Skeie | 385/3 |

Other Publications

Nazarathy, M, J. Berger, A. J. Ley, I. M. Levi, and Y. Kagan (1993) "Progress in externally modulated AM CATV transmission systems" *J. Lightwave Technol.,* 11:82–105.

Kogelnik, H. and R. V. Schmidt (1976) "Switched directional couplers with alternating $\Delta\beta$" *IEEE J. Quantum Electron.* QE-12:396–401.

Thaniyavarn, S. (1986) "Modified 1×2 directional coupler waveguide modulator" *Electron. Lett.* 22(18):941–942.

Thaniyavarn, S. "A synthesized digital switch using 1×2 directional coupler with asymmetric $\Delta\beta$ phase reversal electrode" *IGWO* '88, Santa Fe, Tech. Digest Series vol. 5, paper TuC6.

Samson, S. A., R. F. Tavlykaev, and R. V. Ramaswamy (1997) "Two-Section Reversed $\Delta\beta$ Switch With Uniform Electrodes And Domain Reversal" *IEEE Photon. Technol. Lett.* 9(2):197–199.

Zolotov, E. M. and R. F. Tavlykaev (1988) "Integrated optical Mach-Zehnder modulator with a linearized modulation characteristic" *Sov. J. Quantum Electron., American Inst. Of Physics* 18(3):401–403.

Johnson, L. M. and H. V. Rousell (1988) "Reduction of intermodulation distortion in interferometric optical modulators" *Opt. Lett.* 13(10):928–930.

Korotky, S. K. and R. M. Ridder (1990) "Dual parallel modulation scheme for low-distortion analog optical transmission" *IEEE J. Selected Areas Commun.* 8(7):1377–1381.

Wang, S., H. Erlig, H. R. Fetterman, E. Yablonovitch, V. Grubsky, D. S. Starodubov, and J. Feinberg (1998) "Group Velocity Dispersion Cancellation and Additive Group Delays by Cascaded Fiber Bragg Gratings in Transmission," *IEEE Microwave and Guided Wave Letters,* vol. 8, No. 10, pp. 327–329.

Feng, H., R. F. Tavlykaev, and R. V. Ramaswamy (1999) "Record-High Reflectance in Narrow-Band-Low-Loss Brag Reflectors with Si-on-$LiNbO_3$ Waveguides," *IEE Electronics Letters,* vol. 3, No. 19, pp. 1636–1637.

Guenther, H., G. Wittman, R. M. Macfarlane, and R. R. Neurgaonkar, "Intensity dependence and white-light gating of two-color photorefractive gratings in $LiNbO_3$," *Opt. Lett.,* vol. 22, No. 17, pp. 1305–1307.

What is claimed is:

1. An optical modulator comprising:

an input waveguide section, including a power divider providing two approximately equal outputs from a single input;

a pair of coupled waveguides connected to receive energy from the power divider, and positioned in coupling proximity to each other in a coupling region;

a first means for applying a first electric field to the coupled waveguides in a first section of the coupling region to thereby produce in the first section a first difference $\Delta\beta_1$ between the propagation constant of the first waveguide and the propagation constant of the second waveguide; and a second means for applying a second electric field to the coupled waveguides in a second section of the coupling region to thereby produce in the second section a second difference $\Delta\beta_2$ between the propagation constant of the first waveguide and the propagation constant of the second waveguide;

wherein $\Delta\beta_1$ and $\Delta\beta_2$ have opposite signs, whereby the intensity of optical output from at least one of the coupled waveguides varies approximately linearly with the strength of the first and second electric fields such that said optical switch achieves better than 70% linearity, wherein the second electric field is of the same polarity as the first electric field, wherein said optical switch is fabricated in a polymer material, and wherein the second section of the coupling region has an electro-optic coefficient of opposite sign with respect to an electro-optic coefficient of the first section of the coupling region due to reverse poling of the polymer in either the first section or the second section of the coupling region.

2. An optical modulator comprising:

an input waveguide section, including a power divider providing two approximately equal outputs from a single input;

a pair of coupled waveguides connected to receive energy from the power divider, and positioned in coupling proximity to each other in a coupling region;

a first means for applying a first electric field to the coupled waveguides in a first section of the coupling region to thereby produce in the first section a first difference $\Delta\beta_1$ between the propagation constant of the first waveguide and the propagation constant of the second waveguide; and a second means for applying a second electric field to the coupled waveguides in a second section of the coupling region to thereby produce in the second section a second difference $\Delta\beta_2$ between the propagation constant of the first waveguide and the propagation constant of the second waveguide;

wherein $\Delta\beta_1$ and $\Delta\beta_2$ have opposite signs, whereby the intensity of optical output from at least one of the coupled waveguides varies approximately linearly with the strength of the first and second electric fields such that said optical switch achieves better than 70% linearity, wherein said modulator is fabricated in a substrate which allows one section of the interaction region to be domain-inverted with respect to the other section of the interaction region, and wherein said means for applying an electric field is a uniform traveling-wave electrode structure extending over both sections.

3. The optical modulator according to claim 2, wherein said electrode structure is velocity-matched to said pair of coupled waveguides so that the microwave and optical mode propagate with approximately the same velocities.

4. The optical modulator according to claim 3, wherein said electrode structure is made of thick electrodes to provide velocity matching.

5. The optical modulator according to claim 3, wherein said pair of coupled waveguides comprises a waveguide grating reflector to provide velocity matching.

6. The optical modulator according to claim 5, wherein said pair of coupled waveguides comprise cascaded gratings.

7. The optical modulator according to claim 6, wherein said cascaded gratings comprise a first grating with period $\Lambda_1$ and a second grating with period $\Lambda_2$, wherein sections of said first grating alternate with sections of said second grating.

8. The optical modulator according to claim 7, wherein said gratings comprise an overlay of a high-index of refraction material over said pair of coupled waveguides in a corrugated manner.

9. The optical modulator according to claim 7, wherein said gratings comprise a photorefractive grating immersed into said pair of coupled waveguides.

10. An optical modulator, comprising an input waveguide section, including a power splitter providing two approximately equal outputs from a single input;

a pair of coupled waveguides connected to receive energy from the power splitter, and positioned in coupling proximity to each other in a coupling region;

a first means for applying a first electric field to the coupled waveguides in a first section of the coupling region to thereby produce in the first section a first difference $\Delta\beta_1$ between the propagation constant of the first waveguide and the propagation constant of the second waveguide; and a second means for applying a second electric field to the coupled waveguides in a second section of the coupling region to thereby produce in the second section a second difference $\Delta\beta_2$ between the propagation constant of the first waveguide and the propagation constant of the second waveguide, wherein the second electric field is of opposite direction from the first electric field such that $\Delta\beta_1$ and $\Delta\beta_2$ have opposite signs, whereby the intensity of optical output from at least one of the coupled waveguides varies approximately linearly with the strength of the first and second electric fields such that said optical modulator achieves suppression of harmonic and intermodulation distortion by more than 80 dB below the carrier level at a 4% optical modulation depth.

11. The optical modulator according to claim 10, wherein the second electric field is equal in magnitude but of opposite direction from the first electric field and wherein the length of the first section is approximately 2.3 times the coupling length of the coupled waveguides and the length of the second section is approximately 1.02 times the coupling length of the coupled waveguides, whereby the IMD suppression is at least 103.6 dBc at a 4% optical modulation depth.

* * * * *

UNITED STATES PATENT AND TRADEMARK OFFICE
CERTIFICATE OF CORRECTION

PATENT NO. : 6,236,772 B1
DATED : May 22, 2001
INVENTOR(S) : Robert F. Tavlykaev and Ramu V. Ramaswamy It is certified that error appears in the above-identified patent and that said Letters Patent is hereby corrected as shown below:

Column 1,
Line 51, "10" should read -- IO --.

Column 3,
Line 9, "s=L/l" should read -- $s = L/\ell$ --.
Line 15, "$s_1$=$L_1$/l and $s_2$=$L_2$/l" should read -- $s_1 = L_1/\ell$ and $s_2 = L_2/\ell$ --.

Column 4,
Line 44, "l is the" should read -- $\ell$ is the --.
Line 49, "k=p/2l" should read -- $k = p/2\ell$ --.
Line 50, "x V." should read -- $x \propto V$. --.
Line 53, "s=L/l." should read -- $s = L/\ell$. --.

Column 5,
Line 11, "length l." should read -- length $\ell$. --.
Line 12, "s=L/l," should read -- $s = L/\ell$, --.
Line 61, "$s_1$=$L_1$/l and $s_2$=$L_2$/l" should read -- $s_1 = L_1/\ell$ and $s_2 = L_2/\ell$ --.
Line 65, "m=m($L_1$/l, $L_2$/l)," should read -- $m = m(L_1/\ell, L_2/\ell)$, --

Column 6,
Line 25, "length l" should read -- length $\ell$ --.
Line 39, "$\Delta$l/l for" should read -- $\Delta\ell/\ell$ for --.

UNITED STATES PATENT AND TRADEMARK OFFICE
CERTIFICATE OF CORRECTION

PATENT NO. : 6,236,772 B1
DATED : May 22, 2001
INVENTOR(S) : Robert F. Tavlykaev and Ramu V. Ramaswamy It is certified that error appears in the above-identified patent and that said Letters Patent is hereby corrected as shown below:

Column 7,
Line 10, "length l" should read -- length $\ell$ --.
Line 24, "$\Delta$l/l for" should read -- $\Delta\ell/\ell$ for --.
Line 34, "length l" should read -- length $\ell$ --.
Line 49, "$\Delta$l/l for" should read -- $\Delta\ell/\ell$ for --.
Line 65, "filly" should read -- fully --.

Signed and Sealed this

Twenty-third Day of April, 2002

Attest:

Attesting Officer

JAMES E. ROGAN
Director of the United States Patent and Trademark Office